(12) United States Patent
Knieling et al.

(10) Patent No.: US 8,297,671 B2
(45) Date of Patent: Oct. 30, 2012

(54) CLAW FOR A CONTAINER TRANSPORTING SYSTEM

(75) Inventors: Erwin Knieling, Pfatter (DE); Walter Neumayer, Worth/D (DE)

(73) Assignee: Krones AG, Neutraubling (DE)

( * ) Notice: Subject to any disclaimer, the term of this patent is extended or adjusted under 35 U.S.C. 154(b) by 1221 days.

(21) Appl. No.: 11/884,855

(22) PCT Filed: Jan. 25, 2006

(86) PCT No.: PCT/EP2006/000618
§ 371 (c)(1),
(2), (4) Date: Apr. 1, 2008

(87) PCT Pub. No.: WO2006/089610
PCT Pub. Date: Aug. 31, 2006

(65) Prior Publication Data
US 2008/0272609 A1 Nov. 6, 2008

(30) Foreign Application Priority Data
Feb. 23, 2005 (DE) .................... 20 2005 002 924 U

(51) Int. Cl.
*B66C 1/42* (2006.01)
*B65G 47/84* (2006.01)
*B67C 3/24* (2006.01)

(52) U.S. Cl. .......................... 294/90; 294/198

(58) Field of Classification Search ............... 198/472.1, 198/470.1, 803.3, 803.4, 803.8, 803.11; 294/90, 294/198, 104, 106, 110.1, 86.4; 414/225.01, 414/226.02; 425/534
See application file for complete search history.

(56) References Cited

U.S. PATENT DOCUMENTS

| | | | |
|---|---|---|---|
| 4,093,081 A | 6/1978 | Yver et al. | |
| 4,943,099 A * | 7/1990 | Gabriel | 294/82.32 |
| 5,042,640 A | 8/1991 | Goizueta et al. | |
| 6,386,609 B1 * | 5/2002 | Govzman | 294/207 |
| 6,471,273 B1 * | 10/2002 | Friedrich et al. | 294/65.5 |
| 6,626,476 B1 * | 9/2003 | Govzman et al. | 294/119.1 |
| 7,784,603 B2 * | 8/2010 | Burgmeier | 198/472.1 |
| 8,128,142 B2 * | 3/2012 | Glotzl | 294/116 |
| 2010/0282574 A1 * | 11/2010 | Ueda | 198/803.3 |
| 2011/0180374 A1 * | 7/2011 | Fahldieck | 198/617 |

FOREIGN PATENT DOCUMENTS

DE 2657992 9/1977
(Continued)

OTHER PUBLICATIONS

International Preliminary Report on Patentability based on PCT/EP2006/000618; International Filing Date: Jan. 25, 2006; Date of Issuance: Sep. 11, 2007.

(Continued)

*Primary Examiner* — Paul T Chin
(74) *Attorney, Agent, or Firm* — Marshall, Gerstein & Borun LLP

(57) ABSTRACT

A clamp grip for a container transport system including rare earth permanent magnets encapsulated in non-magnetic material such as high quality steel. Flexible positioning of the magnets allow for adapting to varied design specifications. A rotatable control cam or cams may be used to adjust grip arms between a grip and a release position. Air gap distances between permanent magnets may be designed to maximize repelling force to assist in the functioning of clamp grip mechanism.

16 Claims, 2 Drawing Sheets

FOREIGN PATENT DOCUMENTS

| | | |
|---|---|---|
| DE | 29713510 | 8/1998 |
| DE | 19830456 | 6/1999 |
| DE | 19808058 | 9/1999 |
| EP | 659683 | 6/1995 |
| EP | 1375395 | 1/2004 |
| JP | 2190229 | 7/1990 |
| JP | 6278075 | 10/1994 |
| JP | 2000061876 | 2/2000 |
| SD | 1007968 | 3/1983 |
| WO | WO-9824717 | 6/1998 |

OTHER PUBLICATIONS

Office Action for EP06704083.2 dated Feb. 29, 2012.

* cited by examiner

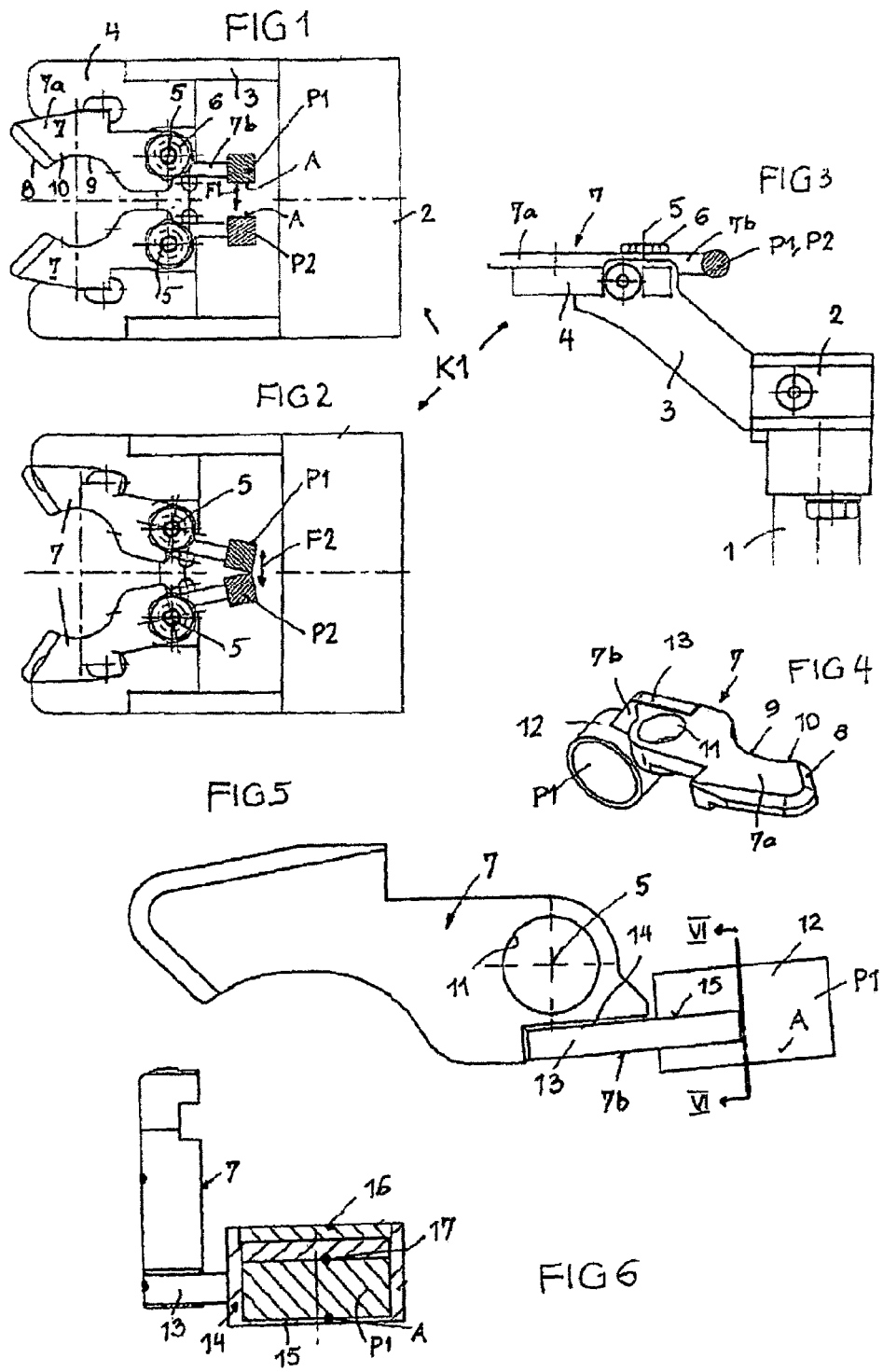

CLAW FOR A CONTAINER TRANSPORTING SYSTEM

CROSS-REFERENCE TO RELATED APPLICATION

The present application claims the benefit of priority of International Patent Application No. PCT/EP2006/00618 filed on Jan. 25, 2006, which application claims priority of German Patent Application No. 20 2005 002 924.6 filed Feb. 23, 2005. The entire text of the priority application is incorporated herein by reference in its entirety.

FIELD OF THE DISCLOSURE

The disclosure relates to a clamp grip for a container transport system, such as a bottle transport system used in bottling operations.

BACKGROUND OF THE DISCLOSURE

Clamp grips that are controlled purely mechanically between the release and the grip positions are known, for example, from EP 0 659 683 A. However, the cost of constructing the mechanical control is high.

From DE 297 13 510 U, mechanically controlled clamp grips are known, and also uncontrolled clamp grips which are then actuated by the containers themselves. The energy storage unit consists, for example, of a spiral or screw compression spring which is actively used between the grip arms. The uncontrolled clamp grip for bottles is opened by the bottles to be gripped and moved to the clamp grip over inclined feeding surface against the force of the energy storage unit, which acts in the direction towards the grip position, and brought into the grip position by the force of the energy storage unit. To remove the bottle, the latter is pulled out of the closed clamp grip, and, in the process, it swivels over the bevelled opening surfaces of the gripper arms against the force of the spring loaded energy storage unit. Due to the force of the spring storage device, the clamp grip automatically returns into the grip position. The mechanically controlled clamp grip is reset in the direction towards the force of the energy storage unit, for example, a rubber spring, which force acts in the direction towards the release position, by a rotatable control cam, into the grip position and back.

Container transport systems, particularly bottle transport systems, must satisfy stringent requirements with regard to microbiological conditions and cleaning; moreover, their operation must be reliable with long service lives and very fast work cycles. Physical springs, such as spiral springs or rubber springs or similar devices, which are positioned in the vicinity of the grip area, i.e., close to the containers to be gripped, are critical with a view to microbiology and cleaning, because small soiling particles become easily deposited there, and, moreover, they are frequently susceptible to aggressive cleaning media, which shorten the service life of the spring which can be damaged mechanically at any time, and break, with the result that the functional capacity of the clamp grip is impaired or lost (high risk of damage to the containers). In addition, during operation, abraded material or contents may separate from the spring.

In the bottle transport technology it has already been proposed to provide, in the case of controlled, multiple-compartment, articulated clamp grips, a retention mechanism with mutually attracting permanent magnets. Mutually attracting permanent magnets can be problematic because, if they come in contact with, or extremely close to, each other, an extremely strong force is required to loosen or separate them, which can lead to an undesired snapping movement of the clamp grip and to extremely high mechanical stress.

SUMMARY OF THE DISCLOSURE

The disclosure is based on the problem of providing an operationally reliable, easily cleaned, controlled or uncontrolled, clamp grip which satisfies the most stringent requirements from the microbiological standpoint.

The mutually repelling permanent magnets in the energy storage unit act as virtual springs without physical connection, where the spring characteristic can be predetermined and optimized by the design of the permanent magnets. The force is generated without any detectable abrupt separation, i.e., when the permanent magnets move away from each other, the repelling force decreases in accordance to the spring characteristic from a maximum which corresponds to the maximum closeness between the permanent magnets. This constitutes an optimal force characteristic for clamp grips. The essential advantages of the virtual springs formed from mutually repelling permanent magnets, in the case of a clamp grip, however, are the rupture safety, the abrasion-free operation, the possibility of preventing undercuts, angles or similar shapes, which could promote the attachment of microorganisms or soiling, and the insensitivity to aggressive cleaning media, combined with a minimal space requirement. Cost effective permanent magnets are available in a great variety of specifications and shapes with high production capacity, which is important for clamp grips because a very large number of clamp grips, for example, 300 or more, may be used in a container transport system.

To achieve a high production capacity with the smallest possible volume, an optimized repelling force course, and still some repelling force, albeit a weak one, even when the permanent magnets are separated, it is advantageous for the permanent magnets to contain predominantly rare earths, or to be manufactured from rare earths. For this purpose, neodymium or samarium, for example, are advantageous, as are chemical elements of the third group of the periodic table of elements, and lanthanides. Such permanent magnets are characterized by a very high power density per unit of surface or volume.

To eliminate deposition spaces for microorganisms and soiling particles, and prevent detrimental influences of potentially aggressive cleaning agents that are used at high pressure, it is advantageous to encapsulate each permanent magnet in nonmagnetic material. For this purpose, it is particularly advantageous to use high quality steel, which can easily be kept free of microorganisms.

In an advantageous embodiment, the permanent magnets are arranged directly on the grip arms, preferably approximately in the center, between the given grip area and the axis of the grip arm. The permanent magnets apply force to the grip arms moving them apart, and they open, for example, the clamp grip with an initially very high and then gradually decreasing repelling force. This repelling force acts advantageously close to the grip area of the grip arms, i.e., close to the gripped container. However, the position of the permanent magnets, as well as their number, can be varied, in adaptation to the conditions, such as the relative adjustment area of the grip arms, and similar factors.

In another advantageous embodiment, the permanent magnets are applied to rigid extensions of the grip arms, preferably in such a way that the axis is located approximately in the center between the grip area and the permanent magnets. In the process, a force is applied, for example, to the grip arms by the repelling force in the direction towards the grip position, and, in this way, the highest force is applied when the clamp grips are open. Naturally, the position of the permanent magnets in relation to the axis or the axes can also be chosen to be different and adapted to the given operating circumstances.

In an advantageous embodiment of an uncontrolled clamp grip, which is opened, for example, by the container itself, and whose grip arms receive a force from the permanent magnets in the direction towards the grip position, the permanent magnets are arranged on rigid extensions of the grip arms.

In this case, an advantageous design can be one in which the just formed repelling surfaces of the permanent magnets are substantially parallel to each other in the grip position, i.e., at the time when the action of the repelling force is weakest, whereas, in the grip position, the surfaces are brought either as close as possible to each other, or in mutual contact, i.e., at the time when the action of the repelling force should be at a maximum. In the position with the lowest repelling force, the repelling surfaces can also enclose a small acute angle, while a reversed acute angle can be advantageous, in the position for the maximum repelling force. This design ensures that the grip arms return as quickly as possible to the grip position, as soon as the container, for example, the neck of a bottle, is introduced into the grip area, or moved out of it.

In principle, each permanent magnet can be advantageously cylindrical, and be accommodated in a capsule housing.

The capsule housing is a can, for example, made of high quality steel, with a thin can bottom, which faces the repelling surface of the permanent magnet, while the open side of the can is closed by an advantageously welded cover.

Between the cover and the permanent magnet, a filling disk can be inserted, for example, to be able to use permanent magnets of different size with one capsule housing size, or to protect the permanent magnet from the welding heat during the welding of the cover.

The extension, on which the capsule housing is arranged, is advantageously offset at a slant with respect to the grip arm, in such a way that the capsule housing is positioned below the bottom side of the grip arm, or below the upper side of the carrier plate, and interferes as little as possible during the operation of the clamp grip.

In an additional advantageous embodiment of a mechanically controlled clamp grip, a rotatable control cam acts between the extensions of the grip arms, to adjust the grip arms back and forth between the grip position and the release position. The repelling force of the permanent magnets acts in the direction towards the release position, and it keeps the extensions in contact with the control cam. In this embodiment, the cylindrical permanent magnets can be accommodated in capsule housings which are fixed with retaining feet in the grip arms. To create a sufficient room for installation for the capsule housing, the inner sides of the grip arms are provided advantageously with recesses In this embodiment, it is advantageous if, in the container grip position, a first air gap between the permanent magnets is provided, so that they repel each other with near maximum repelling force. In contrast, in the absence of a container, the clamp grip can be brought into its extreme closed position, in which a second, but smaller, air gap is provided between the permanent magnets and their capsule housings, and thus the repelling force is highest.

To allow a better adaptation of the force action of the permanent magnets to a given application case, it can be advantageous for the retaining feet to be arranged adjustably in the recesses of the grip arms.

To be able to use the clamp grips to grip the containers reliably, in cases where the dimensions of the containers may present deviations, it is advantageous to provide, between the extensions and the control cam, compensation compression spring pads and/or compensation leaf spring elements. The overall concept, as a result, has the advantage of forming a springy prestressed system without tolerance movements in practically any relative position of the grip arms.

BRIEF DESCRIPTION OF THE DRAWINGS

Embodiments of the object of the disclosure are explained in reference to the drawing. In the drawing:

FIG. 1 shows schematically an uncontrolled clamp grip in a grip position,

FIG. 2 shows the clamp grip of FIG. 1 in a release position,

FIG. 3 shows the uncontrolled clamp grip in a side view,

FIG. 4 shows a perspective view of a concrete embodiment of a grip arm of the clamp grip of FIGS. 1-3, FIG. 5 shows a view of the grip arm in the direction of its swivel axis, FIG. 6 shows a partial cross section in the section plane VI-VI in FIG. 5.

DETAILED DESCRIPTION OF THE DISCLOSURE

Figure 7:
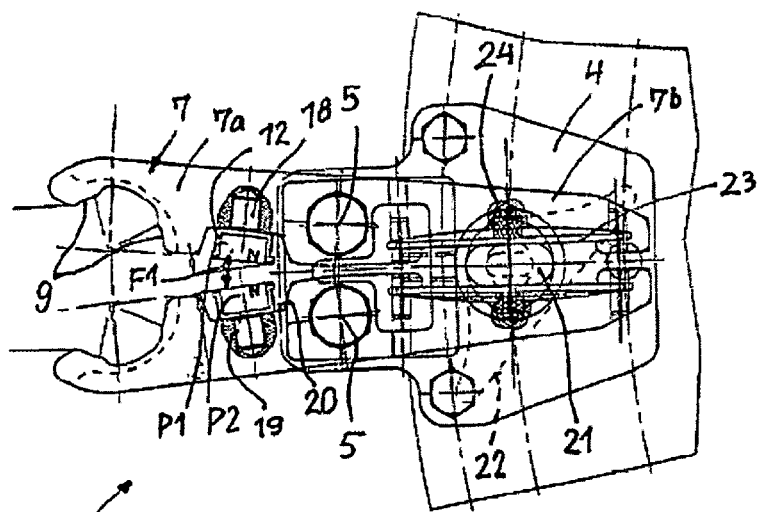
FIG. 7 shows a mechanically controlled clamp grip in a release position, in top view.

The clamp grip K1 shown in FIGS. 1-3 is an uncontrolled clamp grip, which is opened by the introduction and removal movement of a container, which is not shown, and which assumes its grip position automatically, without requiring any action on it from outside.

The clamp grip K1 is supported by a support structure 1 and an optionally swivelable support 2 with an inclined bracket 3, on which a support plate 4 sits. The clamp grip K1 presents two grip arms 7, which are substantially mirror images of each other, and which, in this embodiment, can be swiveled in opposite directions about two separate axles 5, which are fixed, for example, with screws 6, and where the swivel movement is substantially parallel to the plane of the top side of the support plate 4.

Each grip arm has a front grip part 7a with a grip recess 9, a front-side inclined introduction surface 8 and an inclined delivery surface 10. The grip arms 7 are equipped past the axles 5 with rigid extensions 7b. To the end area of each extension 7b, at least one permanent magnet P1, P2 is attached, where the two permanent magnets P1, P2, which work in cooperation with each other, are polarized in opposite directions, so they repel each other. This means that the permanent magnets P1, P2 face each other, for example, with their south poles, or with their north poles. The permanent magnets are manufactured with the predominant use of rare earths, and are very efficient. Such rare earths are preferably neodymium or samarium, but may also include chemical elements of the third group of the periodic table of elements, and lanthanides. The permanent magnets advantageously present substantially flat repelling surfaces A, between which a repelling force F1 or F2 is generated, which varies as a function of the distance between the repelling surfaces A. In the embodiment shown, the repelling force is applied to the grip arms 7 in the direction towards the grip position in FIG.

1, where the repelling force F2 has the maximum value if the clamp grip K1 (FIG. 2) is in its release position. The permanent magnets P1, P2 are oriented towards each other in the swivel direction about the axles 5, and they can be arranged optionally so they can be adjusted along the extension 7b.

In the grip position shown in FIG. 1, the repelling surfaces A are substantially parallel to each other. In the release position shown in FIG. 2, the repelling surfaces enclose an acute angle, which opens towards the axles 5, and they are also in contact, as shown.

In an alternative embodiment, it is also possible to provide, along each extension 7b, more than one permanent magnet P1 or P2, to pattern the course of the repelling force in such a way that a considerable force is still exerted even in the grip position in FIG. 1.

FIGS. 4-6 show a concrete embodiment of the upper gripper arm 7, which is shown more schematically in FIG. 1. The grip arm 7 presents a continuous bore 11 for the axle 5, and it is recessed adjacently to the continuous bore 11. The extension 7b, for example, in the form of an offset flat profile 13 is welded in this recess at 14. The permanent magnet P1 is accommodated with hermetic seal in a capsule housing 12, which, due to the offset of the extension 7b, can be located beneath the bottom side of the grip arm 7 or beneath the top side of the support plate 4 (FIG. 3), so that (see FIG. 3) no interfering or projecting parts are present in the back area of the clamp grip, at the top.

The capsule housing 12 is, for example, a high quality steel can 14 with a thin-walled can bottom 15 and an open top side. The permanent magnet P1 is, for example, in the shape of a cylinder with a flat repelling side A and it is accommodated completely in the capsule housing 12. The open side of the top 14 is closed by a thick-walled high quality steel cover 16, which may be welded, for example. A filling disk 17 can be provided between the cover 16 and the permanent magnet P1.

FIG. 5 shows that the flat repelling side of the permanent magnet P1 is attached so it slants slightly upward, with the result that in the closed position shown in FIG. 1, the two repelling surfaces A enclose a small acute angle, for example, an angle of less than 20°, which opens in the direction away from the axle 5.

Figure 8:
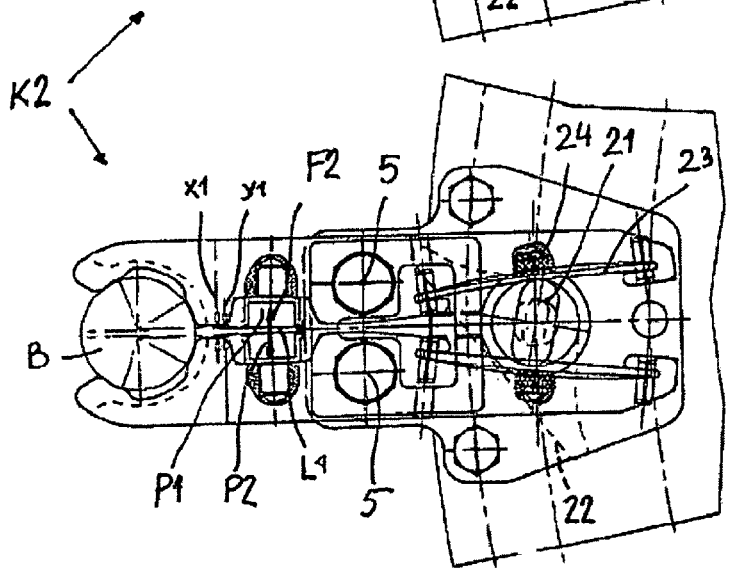
FIG. 8 shows the clamp grip of FIG. 7 in the container grip position.
Figure 9:
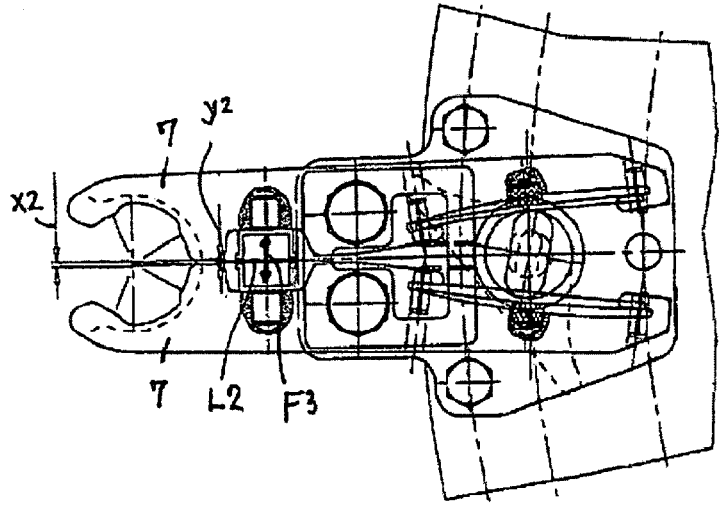
FIG. 9 shows the clamp grip of FIG. 7 and FIG. 8 in an extreme closed position.

FIGS. 7, 8 and 9 show top views of a mechanically controlled clamp grip K2 in the release position (FIG. 7), in the container grip position (FIG. 8), and in an extreme closed position (FIG. 9) without any container B.

The clamp grip K2 again presents two grip arms 7, which are substantially mirror images of each other, which are swivelable about the axles 5, which are separate in this embodiment, in opposite directions, and which present extensions 7b that extend beyond the axles 5. The clamp grip K2 is controlled by a rotatable control cam 21, which can be turned either back and forth, or continuously, by means of a drive cam 22, and which operates between the inner sides of the extensions 7b. Between the control cam 21 and the inner sides of the extensions 7b, leaf springs 23 are also provided, which are applied against the control cam 21, as well as optionally pressure spring pads 24. The leaf springs 23 and/or the pressure spring pads 24 confer to the drive system of the clamp grip K2 an intrinsic springiness and a permanent force transfer contact with the control cam 21, and they compensate for any dimensional deviations among the containers B to be gripped.

On the inner sides of the grip arms 7, between the grip areas 9 and the axles 5, permanent magnets P1, P2, in pairs, are provided, and are mutually repelling. Optionally, more than one pair of permanent magnets P1, P2 can be provided.

Each permanent magnet P1, P2 is accommodated advantageously in the capsule housing 12, which is fixed with a foot part 18 in a recess 19. To be able to accommodate a large useful magnet volume, the inner sides of the grip arms 7 are advantageously shaped with recesses 20. The foot parts 18 can be adjusted optionally in the recesses 19.

In the release position shown in FIG. 7, the oval or elliptic control cams 21 is in a turning position, in which the extensions 7b are approached maximally to each other. The two permanent magnets P1, P2 are apart from each other and they apply a force F1 to each other. In the process, the flat surfaces of the permanent magnets P1, P2 enclose an acute angle, which is open in the direction away from the axles 5.

In the container grip position of the clamp grip K2, which is shown in FIG. 8, the control cam 21 is turned in such a way that it acts substantially with its greatest dimension between the extensions 7b, and slightly deforms the leaf springs 23 as well as the pressure spring pads 24, holding the container B with a predetermined grip force. The permanent magnets P1, P2 are approached to each other, so that, between them, there is an air gap L1 with a dimension, for example, y1, and a relatively strong repelling force F2 is active. The two grip arms 7 are approached to each other leaving only a slit separation x1.

In the extreme closed position of the clamp grip K2, which is shown in FIG. 9, if there is no container B, the grip arms 7 are approached to each other leaving only a slit separation x2, which is smaller than the slit separation x1, and the two permanent magnets are also approached to each other, leaving an air gap y2 which is smaller than the air gap y1. The maximum repelling force F3 is applied.

In the embodiments shown, the grip arms 7 can also be attached so they can be swiveled to a common axle. Furthermore, the repelling surfaces A of the permanent magnets P1, P2 of each pair can optionally be rounded to a convex shape to achieve a different characteristic course of the repelling force. In the embodiment shown in FIGS. 7-9, the permanent magnets P1 can also be embedded directly in the grip arms, assuming that the material of the grip arms 7 is not magnetic, for example, high quality steel. Furthermore, it is possible to attach only one grip arm 7 so it can be swivelled, and to fix the other arm to the support structure.

The invention claimed is:

1. Container clamp grip (K1, K2) for a container transport system, particularly for a bottle transport system, comprising two grip arms (7) which can be swiveled about one common or about two axles (5) between a grip position and a release position, the two grip arms (7) comprising rigid extensions protruding from the respective grip arm beyond the respective axle, a force storing unit arranged between the extensions, the force storing unit urging the extensions with repelling forces and the two grip arms via the extensions in a direction toward the grip position, the container clamp grip being a non-controlled one movable to the release position by a container inserted into or removed from the container clamp grip, wherein the force storing unit presents at least one pair of mutually repelling permanent magnets (P1, P2), the permanent magnets of the pair being arranged at the extensions and facing with south poles or north poles to each other for generating the repelling force urging the grip arms in the direction toward the grip position.

2. Container clamp grip according to claim 1, wherein the mutually facing south poles or north poles of the permanent magnets (P1, P2) of the pair lie in flat or convexly rounded repelling surfaces of the permanent magnets.

3. Container clamp grip according to claim 2, wherein the flat repelling surfaces (A) of the permanent magnets (P1, P2)

of the pair are substantially parallel to each other in the grip position, and, in the release position, they are approached to each other to a maximum.

4. Container clamp grip according to claim 3, wherein in the grip position the repelling surfaces (A) enclose an angle which opens in the direction away from the axle.

5. Container clamp grip according to claim 4, wherein the grip position angle is smaller than 20°.

6. Container clamp according to claim 3, wherein in the release position the repelling surfaces (A) enclose an acute angle which is open in the direction toward the axles.

7. Container clamp grip according to claim 6, wherein the release position angle is greater than 20°.

8. Container clamp grip according to claim 7, wherein the repelling surfaces are brought in contact in the release position of the container clamp grip.

9. Container clamp according to claim 1, wherein each permanent magnet (P1, P2) is encapsulated in a nonmagnetic material.

10. Container clamp grip according to claim 9, wherein each permanent magnet (P1, P2) has a cylindrical shape and is accommodated in a capsule housing (12), the capsule housing (12) being fixed to the grip arm extension (7) and comprising a can (14) with a thin-walled can bottom (15), facing the repelling surface (A) of the permanent magnet (P1, P2), and a thick-walled cover (16), which is applied to the open can.

11. Container clamp grip according to claim 10, wherein a filling body (17) inserted between the cover (16) and the permanent magnets (P1, P2).

12. Container clamp grip according to claim 10, wherein the cover is welded into the open can end.

13. Container clamp grip according to claim 9, wherein the nonmagnetic material is one of steel and high quality steel.

14. Container clamp grip according to claim 1, wherein each grip arm (7) can be swiveled on a support plate (4) above its own axle (5), and wherein each permanent magnet (P1, P2) is arranged in an end area of the respective extension (7b).

15. Container clamp grip according to claim 14, wherein the extension (7b) is offset at a slant with respect to the grip arm (7), in such a way that the capsule housing (12) is positioned one of beneath the bottom side of the grip arms (7), or beneath the top side of the support plate (4).

16. Container clamp grip according to claim 1, where one a grip arm (7) is attached in a manner so it can be swiveled about the axle and the other grip arm (7) is fixed to a support structure (1).

\* \* \* \* \*